United States Patent
Schlieter (10) Patent No.: US 6,178,140 B1
(45) Date of Patent: Jan. 23, 2001

(54) METHOD FOR THREE-DIMENSIONAL BEAM FORMING IN DIRECTION FINDING SYSTEMS

(75) Inventor: Heiko Schlieter, Altenholz (DE)

(73) Assignee: L-3 Communications Elac Nautik GmbH, Kiel (DE)

( * ) Notice: Under 35 U.S.C. 154(b), the term of this patent shall be extended for 0 days.

(21) Appl. No.: 09/275,650

(22) Filed: Mar. 24, 1999

(30) Foreign Application Priority Data

May 19, 1998 (DE) ................................ 198 22 445

(51) Int. Cl.[7] .............. G01S 7/28; G01S 7/52; H01Q 15/02
(52) U.S. Cl. ............................................. 367/103
(58) Field of Search .................. 367/103, 119, 367/138; 342/195, 152, 149

(56) References Cited

U.S. PATENT DOCUMENTS 6,021,096 * 2/2000 Schlieter et al. ............. 367/103

FOREIGN PATENT DOCUMENTS

| 0 540 249 | 5/1993 | (EP) . |
| 0 542 440 | 5/1993 | (EP) . |
| WO 98 23970 | 6/1998 | (WO) . |

* cited by examiner

Primary Examiner—Daniel T. Pihulic
(74) Attorney, Agent, or Firm—Herbert Dubno (57) ABSTRACT

For improving 3D focussing and side lobe suppression in a direction finding system identical groups of transducers are provided at each side of a first and a second axis, which are inclined by an angle $0°\neq\psi<180°$, preferable $\psi=90°$. A first magnitude summation signal is derived from the first pair of transducer groups associated with the first axis and a second magnitude summation signal is derived from the second pair of transducer groups associated with the second axis. Furthermore, a differential signal is derived between the complex output signal of each pair of transducers. For each axis the absolute value of said differential signal is subtracted from the associated magnitude summation signal. The resulting two output signals, associated with said two axis, are then combined to finally obtain a three-dimensionally focussed beam pattern.

11 Claims, 6 Drawing Sheets

METHOD FOR THREE-DIMENSIONAL BEAM FORMING IN DIRECTION FINDING SYSTEMS

CROSS-REFERENCE TO RELATED APPLICATIONS

The present invention is related to earlier U.S. patent application Ser. No. 09/117,252 "Beam forming method in direction finding systems", which is based on international patent application PCT/EP97/06352 and was published as WO 98/23970 on Jun. 4, 1998 (U.S. Pat. No. 6,021,096).

BACKGROUND OF THE INVENTION

According to the earlier patent application two groups of transducers are provided side by side looking to the target whose location is sought. Each group of transducers generates a complex output signal $\Re_L$ and $\Re_R$, respectively. A magnitude summation signal $R_{BSum}=|\Re_L|+|\Re_R|$ is derived from the absolute values $|\Re_L|$ and $|\Re_R|$ of the transducer group output signals. Furthermore, a complex differential signal $\Re_D=\Re_L-\Re_R$ is derived from said transducer group output signals. The absolute value or magnitude $R_D=|\Re_D|$ of the differential signal is then determined. Finally, a resulting output signal $R_{HYP}$ is calculated by either dividing said magnitude summation signal $R_{BSum}$ by the magnitude $|\Re_D|$ of the differential signal, or by subtracting said magnitude $|\Re_D|$ of said differential signal from the magnitude summation signal $R_{BSum}$. Other embodiments of said earlier patent application calculate said resulting output signal $R_{BSum}$ by either dividing the double magnitude $2|\Re_L|$ or $2|\Re_R|$ by said magnitude $|\Re_D|$ of the differential signal, or by subtracting said magnitude $R_D$ the differential signal from said double magnitude $2|\Re_L|$ or $2|\Re_R|$ of the complex output signal $\Re_L$ or $\Re_R$ or one of said groups of transducers. Due to this type of signal processing all side lobes of the magnitude summation signal $R_{BSum}$ or the double magnitude signal $2|\Re_L|$ (or $2|\Re_R|$) of said transducer group output signal, and in particular the otherwise specifically disturbing first sided lobes, are located at the same angular positions as the side lobes of said differential signal. Therewith, those side lobe signals cancel out each other when forming a signal quotient (ratio) or forming a signal difference, as described above. This method therefore results in improved side lobe suppression and enhanced beam focussing. The content of said earlier patent application is herewith included by reference into the disclosure of the present invention.

OBJECT OF THE INVENTION

It is an object of the present invention to improve the three-dimensional or spatial focussing of the beam in all planes which contain the main beam direction, and to achieve a better side lobe suppression around the beam in all three dimensions.

SUMMARY OF THE INVENTION

These and other objects of the invention are achieved with a method of beam forming in direction finding systems having at least three identical groups of transducers, with each group comprising at least one transducer, wherein
  a) a first pair of identical groups of transducers has one group each located at both sides of a first axis (y);
  b) a second pair of identical groups of transducers has one group each located at both sides of a second axis (x), wherein the angle φ between said first and second axis is choosen φ≠0, preferably φ=90°, said method comprising the following steps performed by a signal processing unit;
  c) calculating a first summation signal $R_{Bsum(xz)}$ from the absolute values $|\Re_L|$ and $|\Re_R|$ of the complex output signals $\Re_L$ and $\Re_R$ of the first pair of transducer groups according to equation $$R_{Bsum(xz)}=a\cdot|\Re_L|+b\cdot|\Re_R|, \text{ with } a+b=2; \tag{7a}$$

d) calculating a second summation signal $R_{Bsum(yz)}$ from the absolute values $|\Re_V|$ and $|\Re_H|$ of the complex output signals $\Re_V$ and $\Re_H$ of the second pair of transducer groups according to equation $$R_{Bsum(yz)}=a'\cdot|\Re_V|+b'\cdot|\Re_H|, \text{ with } a'+b'=2; \tag{7b}$$

e) calculating a first differential signal $\Re_{D(xz)}=\Re_L-\Re_R$ from said complex output signals of the first pair of transducer groups, and deriving the absolute value $R_{D(xz)}=|\Re_L-\Re_R|$ thereof;
  f) calculating a second differential signal $\Re_{D(yz)}=\Re_V-\Re_H$ from said complex output signals of the second pair of transducer groups, and deriving the absolute value $R_{D(yz)}=|\Re_V-\Re_H|$ thereof;
  g) calculating a first plane (xz) output signal according to equation $$R_{HYP(xz)}(n)=[(R_{Bsum(xz)})^n-(R_{D(xz)})^n]^{1/n}, \text{ with } 0<n<2; \tag{9a}$$

h) calculating a second plane (yz) output signal according to equation $$R_{HYP(yz)}(m)=[(R_{Bsum(yz)})^m-(R_{D(yz)})^m]^{1/m}, \text{ with } 0<m<2; \tag{9b}$$

i) calculating a 3D(xyz) combined output signal according to equation $$R_{HYP(xyz)}(n,m) = \left[\frac{c(R_{HYPxz}(n))^{1/q} + d(R_{HYPyz}(m))^{1/q}}{2}\right]^q \tag{10}$$

with $0<q<\infty$, $0\leq c \leq 2$, $0\leq d \leq 2$, and $c+d=2$.
Preferably, $a=b=1$ or $a=0$, or $b=0$, and $1\leq q \leq 10$, and $c=d=1$.

The invention also is a method of beam forming in direction finding systems having at least three identical groups of transducers, with each group comprising at least one transducer, wherein
  a) a first pair of identical groups of transducers has one group each located at both sides of a first axis (y);
  b) a second pair of identical groups of transducers has one group each located at both sides of a second axis (x), wherein the angle φ between said first and second axis is choosen φ≠0, preferably φ=90°, said method comprising the following steps performed by a signal processing unit;
  c) evaluating a first summation signal $R_{Bsum(xz)}$ from the absolute values $|\Re_L|$ and $|\Re_R|$ of the complex output signals $\Re_L$ and $\Re_R$ of the first pair of transducer groups according to equation $$R_{Bsum(xz)}=a\cdot|\Re_L|+b\cdot|\Re_R|, \text{ with } a+b=2; \tag{7a}$$

d) calculating a second summation signal $R_{Bsum(yz)}$ from the absolute values $|\Re_V|$ and $|\Re_H|$ of the complex output signals $\Re_V$ and $\Re_H$ of the second pair of transducer groups according to equation $R_{Bsum(yz)} = a' \cdot |\Re_V| + b' \cdot |\Re_H|$, with $a'+b'=2$; (7b)

e) calculating a first differential signal $\Re_{D(xz)} = \Re_L - \Re_R$ from said complex output signals of the first pair of transducer groups, and deriving the absolute value $R_{D(xz)} = |\Re_L - \Re_R|$ thereof;

f) calculating a second differential signal $\Re_{D(yz)} = \Re_V - \Re_H$ from said complex output signals of the second pair of transducer groups, and deriving the absolute value $R_{D(yz)} = |\Re_V - \Re_H|$ thereof;

g) calculating a first plane (xz) output signal according to equation $R_{HYP(xz)}(n) = [(R_{Bsum(xz)})^n - (R_{D(xz)})^n]^{1/n}$, with $0 < n < 2$; (9a)

h) calculating a second plane (yz) output signal according to equation $R_{HYP(yz)}(m) = [(R_{Bsum(yz)})^m - (R_{D(yz)})^m]^{1/m}$, with $0 < m < 2$; (9b)

i) calculating a 3D(xyz) combined output signal according to equation $R_{HYPxyz}(n,m) = [(R_{HYPxz}(n) \cdot R_{HYPyz}(m))]^{1/2}$ (11)

In another aspect, the invention comprises a method of beam forming in direction finding systems having at least three identical groups of transducers, with each group comprising at least one transducer, wherein a) a first pair of identical groups of transducers has one group each located at both sides of a first axis (y);

b) a second pair of identical groups of transducers has one group each located at both sides of a second axis (x), wherein the angle φ between said first and second axis is choosen φ≠0, preferably φ=90°, said method comprising the following steps performed by a signal processing;

c) calculating a first summation signal $R_{Bsum(xz)}$ from the absolute values $|\Re_L|$ and $|\Re_R|$ of the complex output signals $\Re_L$, $\Re_R$ of the first pair of transducer groups according to equation $R_{Bsum(xz)} = a \cdot |\Re_L| + b \cdot |\Re_R|$, with $a+b=2$; (7a)

d) calculating a second summation signal $R_{Bsum(yz)}$ from the absolute values $|\Re_V|$ and $|\Re_H|$ of the complex output signals $\Re_V$ and $\Re_H$ of the second pair of transducer groups according to equation $R_{Bsum(yz)} = a' \cdot |\Re_V| + b' \cdot |\Re_H|$, with $a'+b'=2$; (7b)

e) calculating a first differential signal $\Re_{D(xz)} = \Re_L - \Re_R$ from said complex output signals of the first pair of transducer groups, and deriving the absolute value $R_{D(xz)} = |\Re_L - \Re_R|$ thereof;

f) calculating a second differential signal $\Re_{D(yz)} = \Re_V - \Re_H$ from said complex output signals of the second pair of transducer groups, and deriving the absolute value $R_{D(yz)} = |\Re_V - \Re_H|$ thereof;

g) calculating a first plane (xz) output signal according to equation $R_{HYP(xz)}(n) = [(R_{Bsum(xz)})^n - (R_{D(xz)})^n]^{1/n}$, with $0 < n < 2$; (9a)

h) calculating a second plane (yz) output signal according to equation $R_{HYP(yz)}(m) = [(R_{Bsum(yz)})^m - (R_{D(yz)})^m]^{1/m}$, with $0 < m < 2$; (9b)

i) calculating a 3D(xyz) combined output signal according to equation $R_{HYPxyz}(n,m) = (R_{HYPxz}(n) \cdot R_{HYPyz}(m))$ (12)

In still another aspect, the invention is a method of beam forming in sonar direction finding systems having two identical groups of transducers, with each group comprising at least one transducer, and with one group each mounted aboard of a ship at both sides of a vertical plane which includes the travelling direction of the ship; said method comprising the following steps performed by a signal processing unit:

a) deriving a complex left-side synthetic aperture sonar signal $\Re_{RLsas}$ from the output signals of the transducers of the transducer groups provided at the left side of said vertical plane;

b) deriving a complex right side synthetic aperture sonar signal $\Re_{Rsas}$ from the output signals of the transducers of the transducer group provided at the right side of said vertical plane;

c) calculating a 3D(xyz) combined output signal according to equation $R_{HYP(sas)}(n) = [(a \cdot |\Re_{Lsas}| + b \cdot |\Re_{Rsas}|)^n - |\Re_{Rsas}|^n - |\Re_{Lsas} - \Re_{Rsas}|^n]^{1/n}$ with $0 < n < \infty$ and $a+b=2$.

BRIEF DESCRIPTION OF THE DRAWING

The above and other objects, features, and advantages will become more readily apparent from the following description, reference being made to the accompanying drawing in which:

FIG. 3-I and FIG. 3-II depicts some directivity by using various signal combining methods. The patterns are tilted with respect to each other by 45° around the z-axis. The drawings compare patterns generated with prior art methods, or generated with the methods of said earlier patent application, or generated according to the present invention, respectively.

SPECIFIC DESCRIPTION

Figure 1:
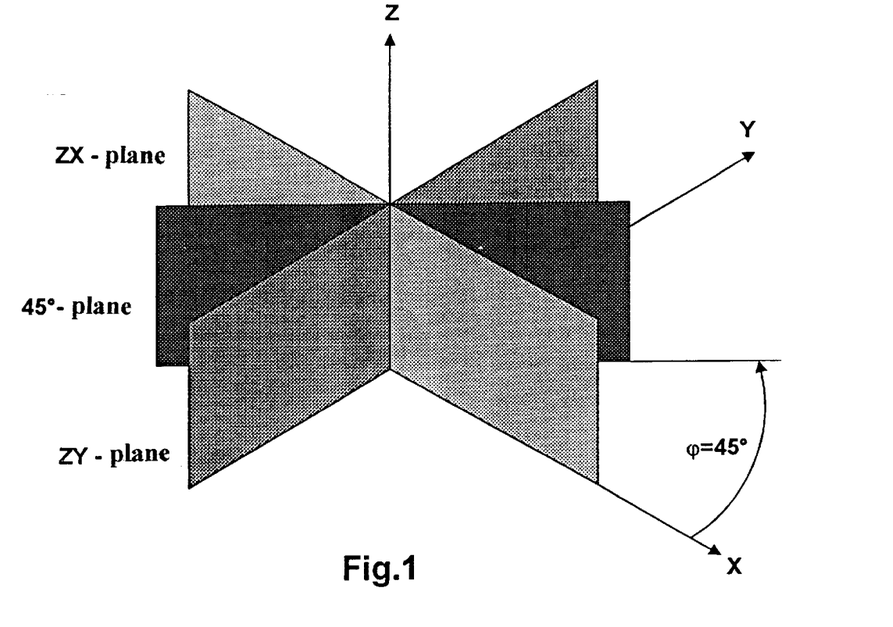
FIG. 1 shows a coordinate system with various focussing planes, each of them including the main beam direction z.

In the coordinate system of FIG. 1 the z-axis extends along the desired main bearing direction, and the flat receiver plane of the transducer array lies in the xy-plane. In order to achieve a three-dimensional bundling of the directivity pattern, the reception signals of two transducer groups each are processed in accordance with the above summarized teaching of said earlier patent application. In the transducer array of FIG. 2, having four groups of transducers $W_{LV}$, $W_{LH}$, $W_{RV}$, $W_{RH}$, the reception signals from the left and the right transducer groups are used for focussing in the zx-plane, and the reception signals from the front and rear transducer groups are used for bundeling in the zy-plane. In the drawings and the specification the indices means L=left, R=right, V=front; H=rear. As an example, the transducer array shown in FIG. 2 for generating the directivity patterns of FIG. 3 consist of four groups of transducers with each group comprising 16 transducers. This array in y-direction extends over $6\lambda$ ($\lambda$=wavelength) and in y-direction over $8\lambda$. Transducer groups $W_{LV}$ and $W_{LH}$ are located left of the y-axis and transducer groups $W_{RV}$ and $W_{RH}$ are provided right of the y-axis. Transducer groups $W_{LV}$ and $W_{RV}$ are shown above the x-axis and transducer groups $W_{LV}$ and $W_{RH}$ are arranged below the x-axis.

The complex output signals delivered by said transducer groups are designed $\mathfrak{R}_V, \mathfrak{R}_H, \mathfrak{R}_{RV}, \mathfrak{R}_{RH}$. FIG. 1 shows with different hatching the two main focussing planes zx and zy together with an intermediate plane, designated as the 45°-plane, which is offset around the z-axis with respect to the zy-plane by 45°. Each of these main focussing planes includes the main bearing direction z.

The magnitude summation signal $R_{BSum}$ and the magnitude differential signal $|\mathfrak{R}_D|$ are calculated as $$R_{BSum} = |\mathfrak{R}_L| + |\mathfrak{R}_R| \text{ or } R_{BSum} = 2|\mathfrak{R}_L| \text{ or } R_{BSum} = 2|\mathfrak{R}_R|,$$

or more generally as $$R_{BSum} = a \cdot |\mathfrak{R}_L| + b \cdot |\mathfrak{R}_R| \text{ with } a+b=2, \tag{7}$$

and $R_D = |\mathfrak{R}_L| - |\mathfrak{R}_R|$.

For focussing in the xz-plane $\mathfrak{R}_L = \mathfrak{R}_{LV} + \mathfrak{R}_{LH}$ and $\mathfrak{R}_R = \mathfrak{R}_{RV} + \mathfrak{R}_{RH}$. For bundeling in the yz-plane $|_V = \mathfrak{R}_{VL} + \mathfrak{R}_{VR}$ and $\mathfrak{R}_H = \mathfrak{R}_{HL} + \mathfrak{R}_{HR}$. Equation (7) for the xz-plane therewith results in $$R_{Bsum(xz)} = a \cdot |\mathfrak{R}_L| + b \cdot |\mathfrak{R}_R|, \text{ with } a+b=2; \tag{7a}$$

and for yz-plane reads $$R_{Bsum(yz)} = a' \cdot |\mathfrak{R}_V| + b' \cdot |\mathfrak{R}_H|, \text{ with } a'+b'=2; \tag{7b}$$

A desired improvement of focussing can be achieved in both main planes xz and yz by using formula $$R_{HYP} = [(R_{BSum})^n - |\mathfrak{R}_D|^n]^{1/2} \text{ with preferably } 0 < n < b \text{ and } 0 < m < 2. \tag{6}$$

For the xz-plane this leads to $$R_{HYPxz}(n) = [(|\mathfrak{R}_L| + |\mathfrak{R}_R|)^n - |\mathfrak{R}_L - \mathfrak{R}_R|^n]^{1/n} \tag{9a}$$

and for the yz-plane to $$R_{HYPyz}(m) = [(|\mathfrak{R}_H| + |\mathfrak{R}_V|)^m - |\mathfrak{R}_H - \mathfrak{R}_V|^m]^{1/m} \tag{9b}$$

If it is desired to improve focussing in the xz-plane as well as in the yz-plane and in all intermediate planes (see FIG. 1), which means a three-dimensionally improved bundeling, then the present invention suggests to combine the two-dimensionally focussed directivity patterns by a specific or geometric averaging operation or by multiplying. In case of such special averaging operation the resulting output direction finding signal is calculated by $$R_{HYP_{xyz}}(n, m) = \left[ \frac{c(R_{HYP_{xz}}(n))^{1/q} + d(R_{HYP_{yz}}(m))^{1/q}}{2} \right]^q, \tag{10}$$

with $0 < q < \infty$, preferably $1 \leq q \leq 10$ and with $0 < c \leq 2$; $0 \leq d \leq 2$ and $c+d=2$, preferably $c=d=1$.

A geometric average forming method according to the following formula also leads to an output direction finding signal with sharper three-dimensional focussing:

$$R_{HYP_{xyz}}(n, m) = [(R_{HYPxz}(n) \cdot R_{HYPyz}(m))]^{1/2} \tag{11}$$

Finally, the two improved directivity patterns may be combined by multiplication according to the following relation, whereat these patters were generated in two orthogonal planes each of them including the main bearing direction z:

$$R_{HYP_{xyz}}(n, m) = R_{HYPxz}(n) \cdot R_{HYPyz}(m) \tag{12}$$

In principle, also other combinations of the two output signals are possible and may have a particular advantage dependent on the requirements and the conditions of a specific application. These output signals are associated with the two main focussing planes. The essential feature is that by the selected combination of the output signal values of the two main planes as derived with formulas (9a) and (9b) a selective influencing and improvement of the resulting three-dimensional directive pattern can be achieved.

Figure 2:
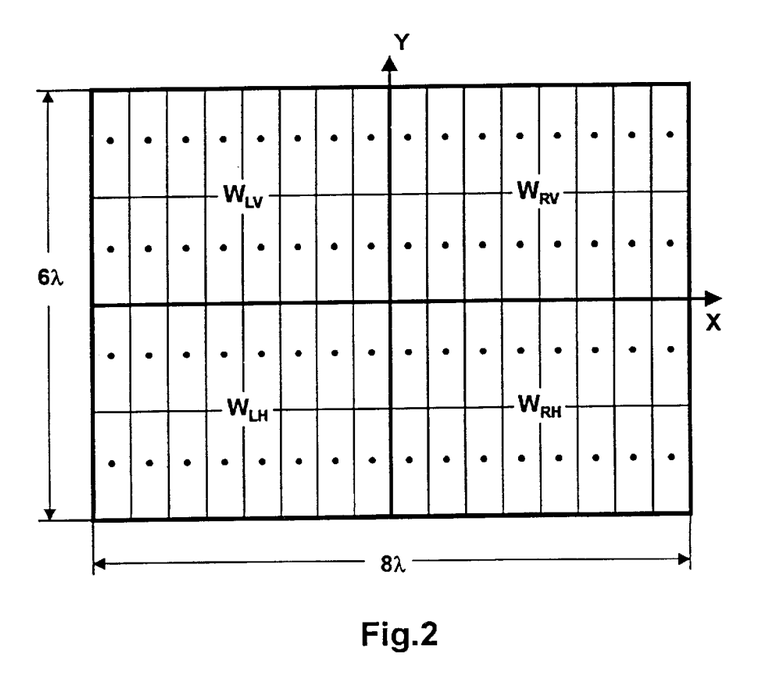
FIG. 2 is a schematic representation of a transducer array with four groups of transducers $W_{LV}$, $W_{RV}$, $W_{LH}$, $W_{RH}$.
Figures 1, 3:
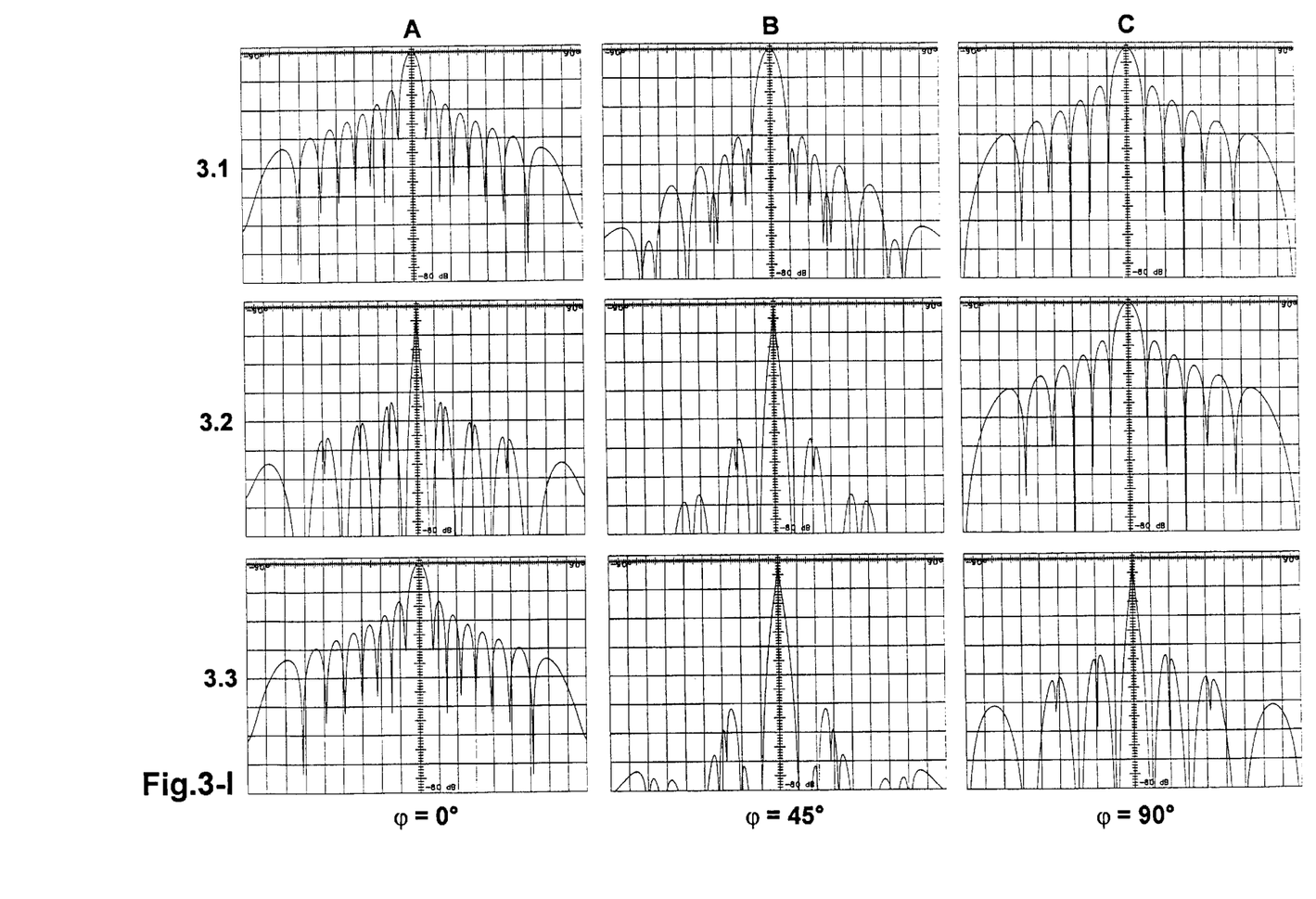
Figures 2, 3:
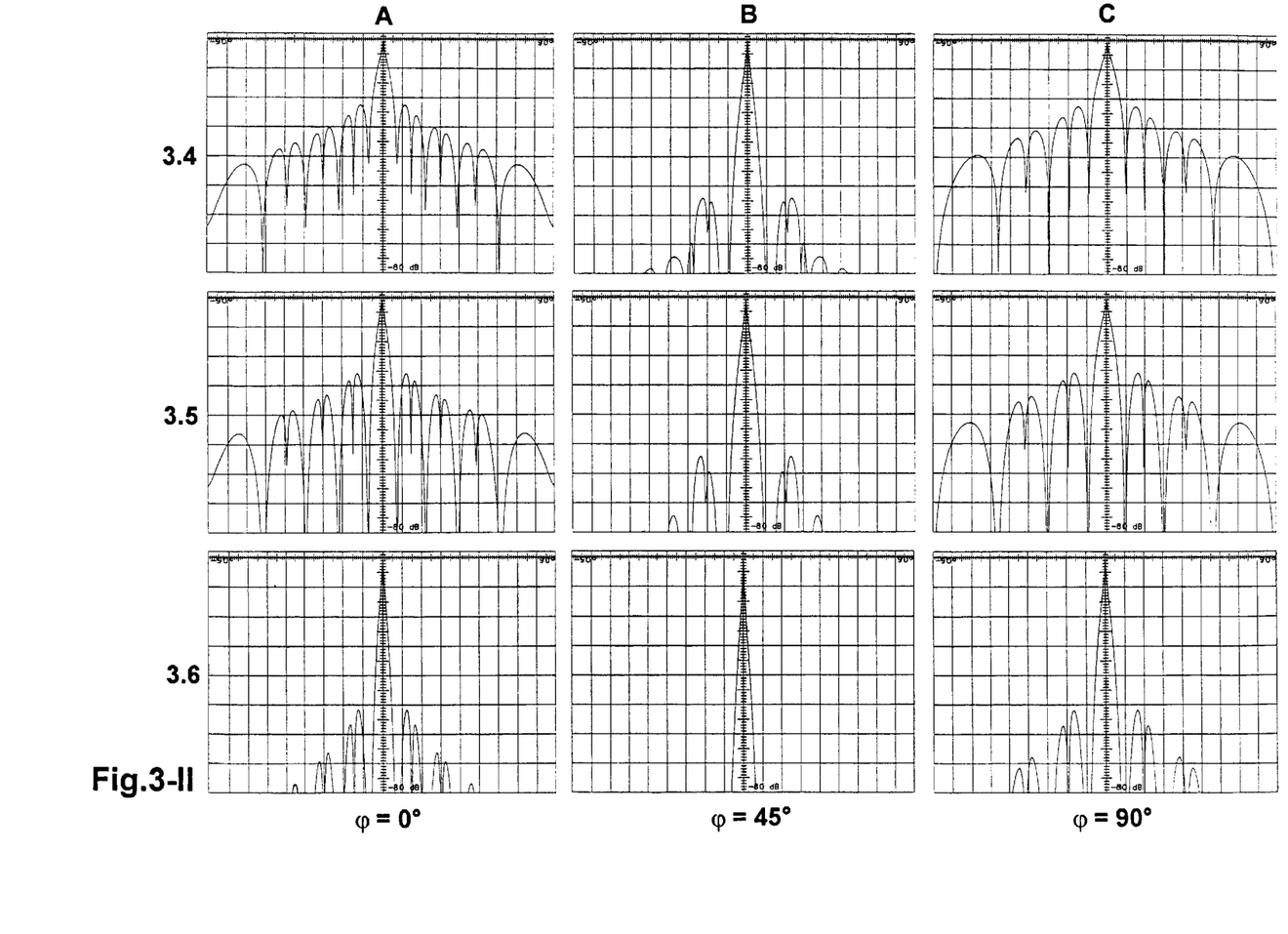

For explaining the achieved improvement reference is made to FIG. 3, including a first sheet 3-1 with diagram rows 3.1 to 3.3, and a second sheet 3-11 with diagram rows 3.4 to 3.6. In each row the left diagram A shows the shape of the directivity pattern in the zx-plane with $\psi=0$, the middle diagram B shows the characteristic in the 45°-plane with $\psi=45°$, and the right diagram C shows the shape of the directivity pattern in the zy-plane with $\psi=90°$. All diagrams are depicted in a logarithmic scale up to a damping of $-80$ dB. These directivity patterns were calculated for a transducer array as shown in FIG. 2.

The first diagram of row 3.1 shows the normal summation signal $R_{Sum} = |\mathfrak{R}_L + \mathfrak{R}_R|$, which in the 45°-plane according to the column B has a lower side lobe amplitude than in the zx-plane (col. A) and in the zy-plane (col. C). The second row 3.2 shows diagrams $R_{HYPxz}$ obtained by signal processing according to formula (9a), and the third row 3.3 shows the output directivity signal $R_{HYPyz}$ calculated along formula (9b). It can be seen that $R_{HYPxz}$ in the zx-plane (col. A) is more sharply focussed than the summation signal $R_{Sum}$. In the 45°-plane (col. B) $R_{HYP}$ again shows an improved bundeling and side lob suppression. In the zy-plane, however (col. C), which is turned by 90° with respect to the zx-plane, the characteristic shows no improvement but remains unchanged. For the output bearing signal $R_{HYPyz}$ shown in row 3.3, the relations are just inverted. In the zx-plane (col. A) the bearing signal remains essentially unchanged. In the 45°-plane (col. B) the signal is somewhat better focussed. In the zy-plane (col. C) this output bearing signal shows still better focussing.

Row 3.4 depicts diagrams obtained in accordance with the present invention by calculating the resulting output signal $R_{HYPxyz}$ according to formula (10) with q=2 and c=d=1. Row 3.5 is the result of signal processing along formula (11) and row 3.6 is the result of using formula (12). In all three cases an enhanced focussing and an improved side lobe suppression is achieved in all spatial planes (see col. A, B, and C) when compared with the normal summation signal (row 3.1). The directivity patterns of row 3.6 in particular show the essential improvement beam focussing as well as the increased suppression of side lobes.

Up to now the three-dimensional bundeling of the directive beam was described with reference to a transducer array as shown in FIG. 2 having two orthogonally oriented groups of transducers ($\psi=90°$) with main focussing planes zx, zy being arranged rectangularily with respect to each other. Without limitation of the general validity it was assumed $\psi=0$ for the zx-plane and $\psi=90°$ for the zy-plane.

The invention, however, is not restricted to pairs of transducer groups which are oriented orthogonally with respect to each other. The pairs of transducer groups rather can also be arranged at another angle ψ if ψ≠0. It must only be made sure that identical transducer groups and pairs of transducer groups are provided. Equations (7), (9a), and (9b) as well as combining equations (10), (11), and (12) are to be used accordingly, If one further assumes that the first main focussing plane is the zy-plane with ψ=0, then the second main focussing plane is no longer turned by 90° but another angle ψ=90° around the z-axis. Whilst $R_{HYP\triangledown}$ according to formula (9a) still is the output signal in the first main focussing plane (xz-plane), the second main focussing plane is no longer the yz-plane with ψ=90°, but is an intermediate plane which turned around the z-axis in relation to the xz-plane by any angle with ψ≠90°. This plane therefore is designated in ψz-plane. Equation (9b) then results in an output signal $R_{HYP\psi z}$ in this second main focussing plane, which thereafter is processed, instead of $R_{HYPyz}$, in accordance with equations (10), (11), and (12).

Figure 4:
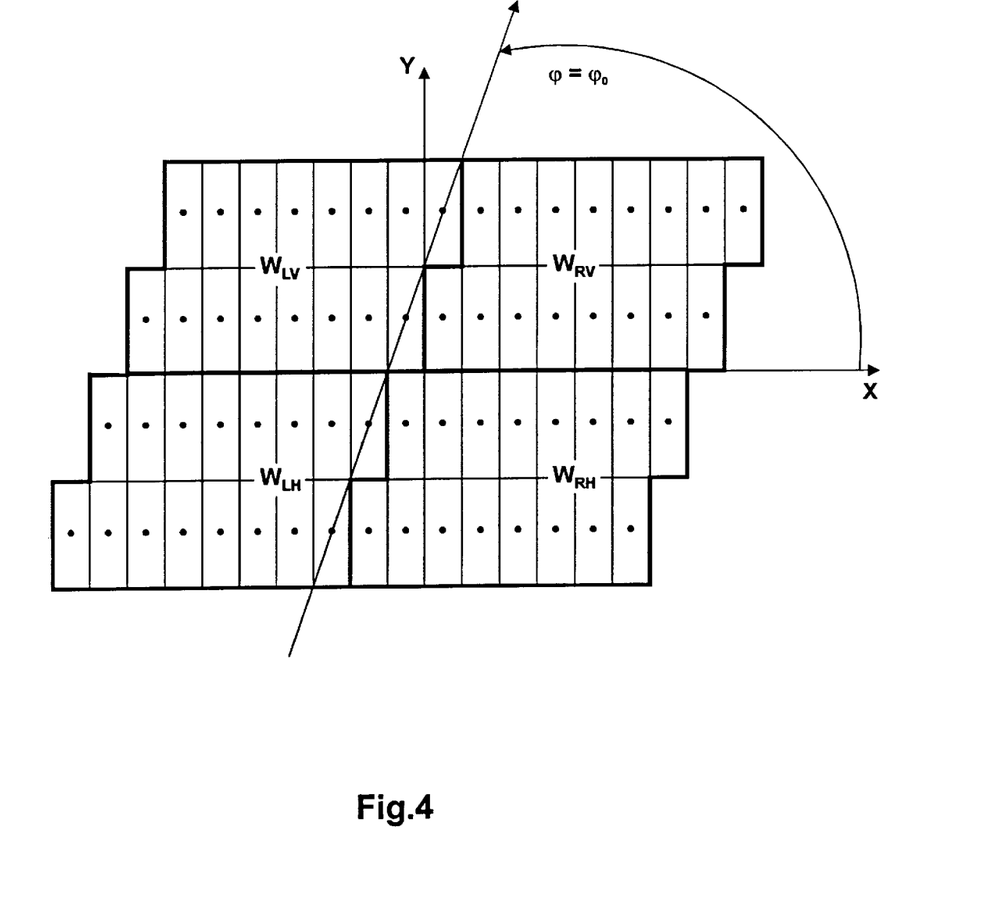
FIG. 4 shows a transducer array where the two pairs of transducer groups are not arranged rectangularily with respect to each other.

An example of such an arrangement of transducers is shown in FIG. 4 where four transducer groups $W_{LH}$, $W_{LV}$, $W_{RH}$, and $W_{RV}$ are used to form two pairs of transducer groups which are not oriented orthogonally with respect to each other. The main focussing planes are here the zx-plane and a ψz-plane which is turned in relation to the zx-plane by an angle ψ≠90° and which includes the z-axis.

Figure 5:
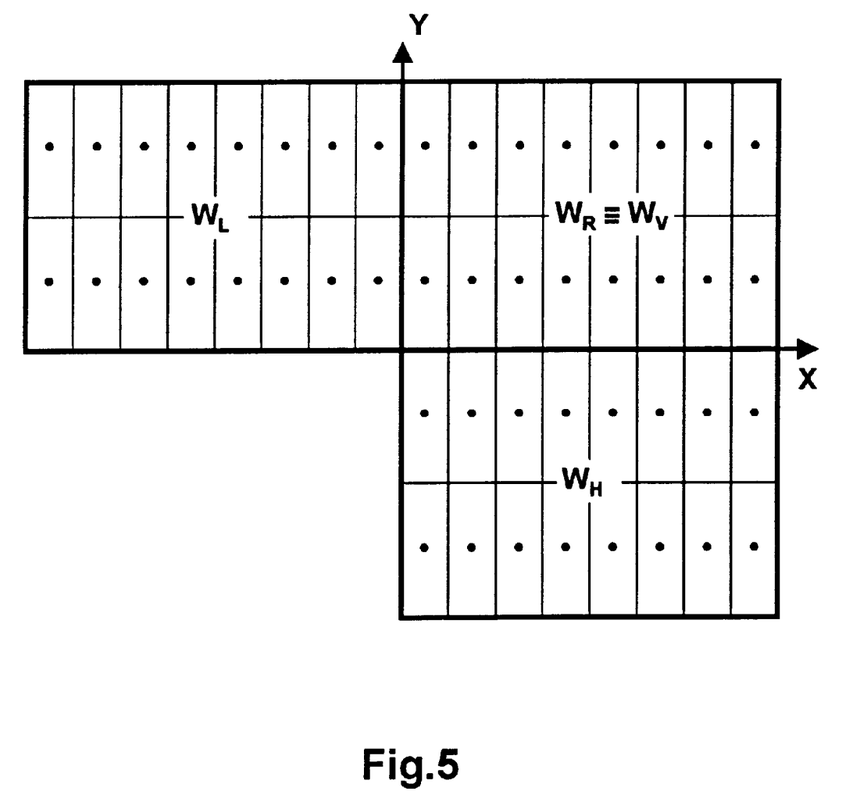
FIG. 5 is a transducer array with three groups of transducers $W_L$, $R_R \equiv W_V$, $W_H$.

For achieving a three-dimensional focussing of the beam two-pairs of transducer groups can be formed not only out of four transducer groups as described above. For this purpose rather even three transducer groups are sufficient. An example is shown in FIG. 5. The complex output signals $\Re_L$, $\Re_R$, $\Re_V$, $\Re_H$ for calculating in accordance with equations (9a) and (9b) here are obtained from three transducer groups $W_L$, $W_H$, and $W_R=W_V$, with $\Re_R=\Re_V$. Also in this case the pairs of transducer groups can be arranged angularily offset by an angle ψ≠0.

The improvement of the directivity pattern as achieved by the present invention is also obtained for those directivity patterns the main bearing direction of which can be tilted by phase shifted energizing of the transducers in the individual transducer groups.

The application of the invention on board of a ship or submarine with side-looking sonar has the advantage, that besides a good focussing sharpness in the lateral main bearing direction an enhanced side lobe suppression is achieved in travelling direction of the ship, so that the noise of the ship propeller does not impair the bearing operation. The lateral main bearing direction also in this case may be tiltable.

Figure 6:
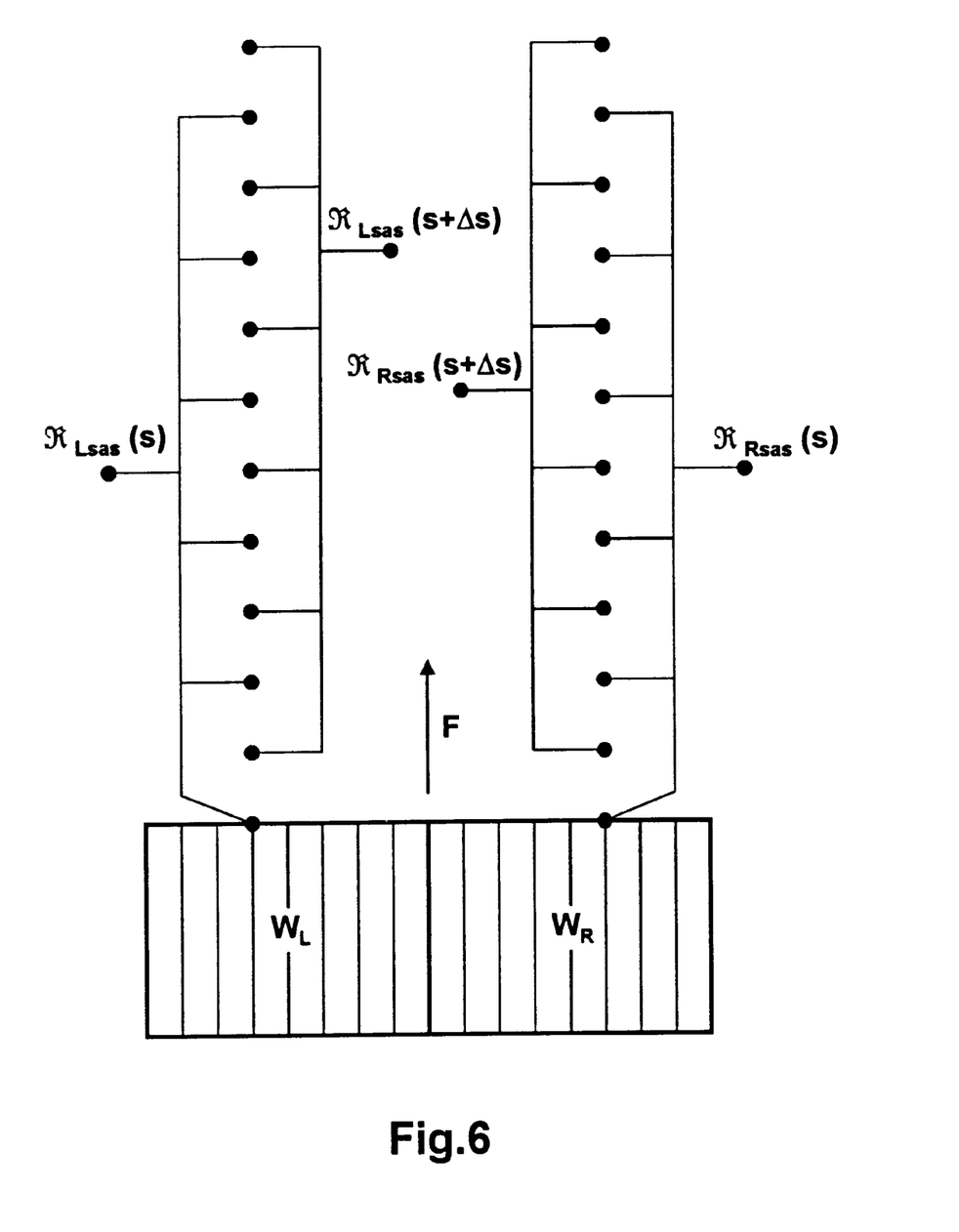
FIG. 6 shows an application of the present invention where beam focussing in the plane including the direction of ship motion is improved by a Synthetic Apertures Sonar (SAS) method.

A further embodiment of the invention is shown in FIG. 6. A ship is provided with a left group of transducers $W_L$ and a right group of transducers $W_R$. Both groups extend horizontally, i.e. their echo beam is directed downwards. Each transducer group comprises several transducer elements so that the main bearing direction may be tilted laterally by phase shifted energizing and/or scanning the transducers. Both transducer groups are arranged side by side with respect to the ship's moving direction F. By using equation (9a) an improved focussing is achieved below the ship and laterally in a vertical plane extending laterally with respect to the direction of ship motion. In order to improve focussing also in the planes which include the direction of ship motion F, a so-called synthetic aperture is used. Along the traveling path of the ship bearing operations are performed at predetermined spatial or time distances Δs or Δt, respectively, and the complex reception signals $\Re_{Lsas}$ and $\Re_{Rsas}$ generated by the two transducer groups are stored.

This method is known as such and is called Synthetic Aperture Sonar SAS. With this method the resulting aperture of the transducer array is essentially increased in relation to the physical dimensions of said array. Therewith focussing of the bearing beam is improved. Said stored signals, measured at different path position $s_i$, then are superimposed with phase shifting, in order to a generate a directivity pattern, which is sharply focussed in a plane which includes the direction of ship motion. For more sharply focussing this directivity pattern also in a vertical plane extending perpendicularly in relation to the direction F of ship motion, the two complex output signals $\Re_{Lsas}$ and $\Re_{Rsas}$ of the left and right transducers groups $W_L$ and $W_R$, respectively, are processed further e.g. along the combination of equation (6), which then leads to a resulting output bearing signal $$R_{HYPsas}(n)=[(|\Re_{Lsas}|+|\Re_{Rsas}|)^n-|\Re_{Lsas}-\Re_{Rsas}|^n]^{1/n} \quad (13)$$

with 0<n<∞. For this calculation, both the magnitude as well as the phase conditions of signals $\Re_{Lsas}$ and $\Re_{Rsas}$ must be available, which means that the left and right SAS-signals must be generated and stored as complex signals.

What is claimed is:

1. A method of beam forming in direction finding systems having at least three identical groups of transducers, with each group comprising at least one transducer, wherein a) a first pair of identical groups of transducers has one group each located at both sides of a first axis (y);

b) a second pair of identical groups of transducers has one group each located at both sides of a second axis (x), wherein the angle ψ between said first and second axis is choosen ψ≠0, said method comprising the following steps performed by a signal processing unit:

c) calculating a first summation signal $R_{BSum(xz)}$ from the absolute values $|\Re_L|$ and $|\Re_R|$ of the complex output signals $\Re_L$, $\Re_R$ of the first pair of transducer groups according to equation $$R_{Bsum(xz)}=a\cdot|\Re_L|+b\cdot|\Re_R|, \text{ with } a+b=2; \quad (7a)$$

d) calculating a second summation signal $R_{Bsum(yz)}$ from the absolute values $|\Re_V|$ and $|\Re_H|$ of the complex output signals $\Re_V$, $\Re_H$ of the second pair of transducer groups according to equation $$R_{Bsum(yz)}=a'\cdot|\Re_V|+b'\cdot|\Re_H|, \text{ with } a'+b'=2; \quad (7b)$$

e) calculating a first differential signal $\Re_{D(xz)}=\Re_L-\Re_R$ from said complex output signals of the first pair of transducer groups, and deriving the absolute value $R_{D(xz)}=|\Re_L-\Re_R|$ thereof;

f) calculating a second differential signal $\Re_{D(yz)}=\Re_V-\Re_H$ from said complex output signals of the second pair of transducer groups, and deriving the absolute value $R_{D(yz)}=|\Re_V-\Re_H|$ thereof;

g) calculating a first plane (xz) output signal according to equation $$R_{HYP(xz)}(n)=[(R_{Bsum(xz)})^n-(R_{D(xz)})^n]^{1/n}, \text{ with } 0<n<2; \quad (9a)$$

h) calculating a second plane (yz) output signal according to equation $$R_{HYP(yz)}(m)=[(R_{Bsum(yz)})^m-(R_{D(yz)})^m]^{1/m}, \text{ with } 0<m<2; \quad (9b)$$

i) calculating a 3D(xyz) combined output signal according to equation $$R_{HYP_{xyz}}(n, m) = \left[\frac{c(R_{HYP_{xz}}(n))^{1/q} + d(R_{HYP_{yz}}(m))^{1/q}}{2}\right]^q, \quad (10)$$

with $0<q<\infty$, $0\leq c\leq 2$, $0\leq d\leq 2$, and $c+d=2$.

2. The method of claim 1, wherein $a=b=1$.
3. The method of claim 1, wherein $a=0$ or $b=0$.
4. The method of claim 1, wherein $1\leq q\leq 10$.
5. The method of claim 4, wherein $c=d=1$.
6. A method of beam forming in direction finding systems having at least three identical groups of transducers, with each group comprising at least one transducer, wherein
   a) a first pair of identical groups of transducers has one group each located at both sides of a first axis (y);
   b) a second pair of identical groups of transducers has one group each located at both sides of a second axis (x), wherein the angle ψ between said first and second axis is choosen ψ≠0, said method comprising the following steps performed by a signal processing unit:
   c) calculating a first summation signal $R_{Bsum(xz)}$ from the absolute values $|\Re_L|$ and $|\Re_R|$ of the complex output signals $\Re_L$, $\Re_R$ of the first pair of transducer groups according to equation $R_{Bsum(xz)}=a\cdot|\Re_L|+b\cdot|\Re_R|$, with $a+b=2$; (7a)

d) calculating a second summation signal $R_{Bsum(yz)}$ from the absolute values $|\Re_V|$ and $|\Re_H|$ of the complex output signals $\Re_V$, $\Re_H$ of the second pair of transducer groups according to equation $R_{Bsum(yz)}=a'\cdot|\Re_V|+b'\cdot|\Re_H|$, with $a'+b'=2$; (7b)

e) calculating a first differential signal $\Re_{D(xz)}=\Re_L-\Re_R$ from said complex output signals of the first pair of transducer groups, and deriving the absolute value $R_{D(xz)}=|\Re_L-\Re_R|$ thereof;
   f) calculating a second differential signal $\Re_{D(yz)}=\Re_V-\Re_H$ from said complex output signals of the second pair of transducer groups, and deriving the absolute value $R_{D(yz)}=|\Re_V-z,1\ _H|$ thereof;
   g) calculating a first plane (xz) output signal according to equation $R_{HYP(xz)}(n)=[(R_{Bsum(xz)})^n-(R_{D(xz)})^n]^{1/n}$, with $0<n<2$; (9a)

h) calculating a second plane (yz) output signal according to equation $R_{HYP(yz)}(m)=[(R_{Bsum(yz)})^m-(R_{D(yz)})^m]^{1/m}$, with $0<m<2$; (9b)

i) calculating a 3D(xyz) combined output signal according to equation $R_{HYP_{xyz}}(n,m)=(R_{HYPxz}(n)\cdot R_{HYPyz}(m))^{1/2}$. (11).

7. A method of beam forming in direction finding systems having at least three identical groups of transducers, with each group comprising at least one transducer, wherein
   a) a first pair of identical groups of transducer has one group each located at both sides of a first axis (y);
   b) a second pair of identical groups of transducers has one group each located at both sides of a second axis (x), wherein the angle ψ between said first and second axis is choosen ψ≠0, said method comprising the following steps performed by a signal processing unit:
   c) calculating a first summation signal $R_{Bsum(xz)}$ from the absolute values $|\Re_L|$ and $|\Re_R|$ of the complex output signals $\Re_L$, $\Re_R$ of the first pair of transducer groups according to equation $R_{Bsum(xz)}=a\cdot|\Re_L|+b\cdot|\Re_R|$, with $a+b=2$; (7a)

d) calculating a second summation signal $R_{Bsum(yz)}$ from the absolute values $|\Re_V|$ and $|\Re_H|$ of the complex output signals $\Re_V$, $\Re_H$ of the second pair of transducer groups according to equation $R_{Bsum(yz)}=a'\cdot|\Re_V|+b'\cdot|\Re_H|$, with $a'+b'=2$; (7b)

e) calculating a first differential signal $\Re_{D(xz)}=\Re_L-\Re_R$ from said complex output signals of the first pair of transducer groups, and deriving the absolute value $R_{D(xz)}=|\Re_L-\Re_R|$ thereof;
   f) calculating a second differential signal $\Re_{D(yz)}=\Re_V-\Re_H$ from said complex output signals of the second pair of transducer groups, and deriving the absolute value $R_{D(yz)}=|\Re_V-z,1\ _H|$ thereof;
   g) calculating a first plane (xz) output signal according to equation $R_{HYP(xz)}(n)=[(R_{Bsum(xz)})^n-(R_{D(xz)})^n]^{1/n}$, with $0<n<2$; (9a)

h) calculating a second plane (yz) output signal according to equation $R_{HYP(yz)}(m)=[(R_{Bsum(yz)})^m-(R_{D(yz)})^m]^{1/m}$, with $0<m<2$; (9b)

i) calculating a 3D(xyz) combined output signal according to equation $R_{HYP_{xyz}}(n,m)=R_{HYPxz}(n)\cdot R_{HYPyz}(m)$. (12).

8. A method of beam forming in sonar direction finding systems having two identical groups of transducers, with each group comprising at least one transducer, and with one group each mounted aboard of a ship at both sides of a vertical plane which includes the travelling direction of the ship, said method comprising the following steps performed by a signal processing unit:
   a) deriving a complex left-side synthetic aperture sonar signal $\Re_{Lsas}$ from the output signals of the transducers of the transducer group provided at the left side of said vertical plane;
   b) deriving a complex right side synthetic aperture sonar signal $\Re_{Rsas}$ from the output signals of the transducers of the transducer group provided at the right side of said vertical plane;
   c) calculating a 3D(xyz) combined output signal according to equation $R_{HYPsas}(n)=[(a\cdot|\Re_{Lsas}|+b\cdot|\Re_{Rsas}|)^n-|\Re_{Lsas}-\Re_{Rsas}|^n]^{1/n}$, (13)

with $0<n<\infty$ and $a+b=2$.

9. The method of claim 6 wherein ψ=90°.
10. The method of claim 7 wherein ψ=90°.
11. The method of claim 1 wherein ψ=90°.

* * * * *